(12) United States Patent
Scoca et al.

(10) Patent No.: US 8,335,129 B2
(45) Date of Patent: Dec. 18, 2012

(54) SYSTEM AND METHOD TO EXTEND DEEP WATER CORRELATION SONAR SYSTEMS TO SHALLOW DEPTHS

(75) Inventors: Anthony L. Scoca, Hicksville, NY (US); James Huber, North Babylon, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 385 days.

(21) Appl. No.: 12/613,009

(22) Filed: Nov. 5, 2009

(65) Prior Publication Data

US 2011/0103188 A1    May 5, 2011

(51) Int. Cl.
*G01S 15/58* (2006.01)
(52) U.S. Cl. .......................................................... 367/89
(58) Field of Classification Search ...................... 367/89
See application file for complete search history.

(56) References Cited

U.S. PATENT DOCUMENTS

| | | | | |
|---|---|---|---|---|
| 4,244,026 | A | * | 1/1981 | Dickey, Jr. ..................... 702/143 |
| 5,315,562 | A | * | 5/1994 | Bradley et al. .................. 367/89 |
| 5,422,860 | A | * | 6/1995 | Bradley et al. .................. 367/89 |
| 7,133,327 | B2 | * | 11/2006 | Zhu et al. ........................ 367/91 |

FOREIGN PATENT DOCUMENTS

WO    WO 2004083891 A1 *  9/2004

\* cited by examiner

*Primary Examiner* — Ian Lobo
(74) *Attorney, Agent, or Firm* — Schwegman, Lundberg & Woessner, P.A.

(57) ABSTRACT

In an embodiment, a correlation SONAR system is adapted for use in shallow water. A pulse generator transmits an initial burst of pulses towards a bottom of a body of water. Echoes of the initial burst of pulses are received on a hydrophone array. After the receiving the echoes of the initial burst of pulses, a second burst of pulses is transmitted towards the bottom of the body of water. The echoes of the second burst of pulses are received on the hydrophone array, and a SONAR processor correlates a pulse from the initial burst of pulses and a pulse from the second burst of pulses to calculate a velocity estimate.

20 Claims, 9 Drawing Sheets

SYSTEM AND METHOD TO EXTEND DEEP WATER CORRELATION SONAR SYSTEMS TO SHALLOW DEPTHS

TECHNICAL FIELD

The present disclosure relates to SONAR systems, and in an embodiment, but not by way of limitation, an extension of deep water correlation SONAR systems to shallow depths.

BACKGROUND

Velocity measuring SONAR systems are typically used for submersible shipboard applications for which continuous Global Positioning System (GPS) information is not available. There are two basic types of velocity measuring SONAR systems—Doppler and correlation, each of which has advantages and disadvantages. Doppler SONAR is useful for shallow to moderate ocean bottom depths for which transmission losses associated with its off angle transmissions and receptions are tolerable. But those transmission losses generally preclude the use of Doppler SONAR for deep depths. Correlation SONAR involves transmission and reception normal to the ocean bottom and is thus not fraught with severe transmission loss issues even for deep ocean bottom depths. However, the performance of correlation SONAR systems degrades for elevated ships speed and shallow bottom depths because of physical limitations in the size of the hydrophone array.

Correlation SONAR processing to determine the velocity of a ship involves correlation of two echo signals received within a hydrophone array from pulses transmitted at different times. Correlation is made between the initial transmission echo received on a "reference" hydrophone in the array and the later transmission echo received on each of the array hydrophones. An estimate of distance traveled by the ship is made by identifying the hydrophone which provides the maximum correlation with the initial transmission echo received on the reference hydrophone. This spatial separation is equal to the total distance traveled during two time periods (the time between the two transmissions and time between the two echoes). The time between the two transmissions is called the correlation time (denoted as $\tau$) and is chosen so that the physical location of the correlation maximum is consistent with the size of the hydrophone array. Since the measured distance is over two periods, distance is converted to velocity by dividing by twice the correlation time to provide a "pulse pair velocity estimate". FIG. 1 depicts the correlation process 110, a correlation time of bottom return echoes 120, and a typical correlation SONAR hydrophone array geometry 130.

Highly accurate correlation SONAR systems require use of ocean bottom echoes vice water volume reverberation information which is contaminated by ocean currents. Furthermore, because of the rapidly increasing attenuation of sound in water with frequency, deep depth ground referenced correlation SONAR systems must generally use transmit frequencies which do not exceed 20 khz. Such low frequencies adversely impact accuracy as illustrated by the theoretical random error model for correlation SONAR horizontal velocity measurements:

$$\sigma_H = K_1 * \sqrt{\frac{1}{N} * \frac{1}{\tau} * \frac{\lambda}{\theta_{BW}} * \left(1 + \left(\frac{P_N}{P_S}\right)\right)} \quad (1)$$

wherein
 $K_1$ = a constant
 $N$ = number of independent samples of data in bottom return echo
 $\lambda$ = transmit frequency length
 $\tau$ = correlation time
 $P_N$ = ambient noise power
 $P_s$ = echo signal power
 $\Theta_{BW}$ = composite transmit/receive beam width and $\lambda = c/f_0$
in which
 c = speed of sound in water
 $f_0$ = transmit frequency Deep depth correlation SONAR systems can be designed to provide good accuracy despite the transmit frequency constraint by employing a sufficiently large hydrophone array (to obtain a long correlation time) and a relatively wide transmit/receive beam width. A wide beam pattern benefits accuracy directly via parameter $\Theta_{BW}$. It also improves accuracy by increasing N. It can be shown that:

$$N = K_2 * f_s * D * \int_\theta \int_\phi S_f(\theta,\phi) B(\theta,\phi) d\theta d\phi \quad (2)$$

where:
 $K_2$ = a constant
 D = depth below keel
 $f_s$ = number of independent samples of data per second
 $S_f(\theta, \phi)$ = ocean bottom echo scattering function
 $B(\theta, \phi)$ = composite transmit/receive beam pattern function wherein $\theta$ and $\phi$ are the beam angles off the main response axis in polar coordinates It can further be shown that the number of independent samples of data per second, fs, is inversely proportional to 1/PW, where PW is the transmit pulse width. $S_f$, the ocean bottom echo scattering function, is a complex function of bottom type involving bottom roughness, bottom slope, and transmit frequency which establish the ocean backscattering characteristic that affects echo duration.

A deep depth correlation SONAR system can be expected to provide degraded accuracy in shallow water because (a) the correlation time is constrained by short signal roundtrip time, and (b) echo duration can be expected to provide a small number of samples (parameter N in Equation No. 1). In an embodiment, shallow water is a depth of water wherein the achievable correlation time is less than the desired correlation time (See FIG. 3). Ground referenced shallow water correlation SONAR systems achieve high accuracy by using relatively high transmit frequencies (e.g., 75-300 khz). Such SONAR systems can provide operation for all ocean bottom depths by transitioning to the much less accurate water referenced mode for deep bottoms.

A correlation SONAR system transmits a series of pulses vertically towards the ocean bottom, opens a receive window at a time prior to the expected location of the first bottom return echo, keeps the window open long enough to receive the entire pulse train, and provides an additional time period for data processing during which neither transmissions nor receptions take place. This completes a "SONAR cycle" and successive cycles follow. The events within a SONAR cycle are illustrated in FIG. 2.

Typical SONAR systems provide excellent velocity accuracy over wide range of bottom depths, but exhibit degraded performance over shallow depths because of the aforementioned constraints on $\tau$ and N. A desired correlation time is computed (denoted $\tau_d$) such that, for the example hydrophone array shown in FIG. 1, the correlation peak will occur at nominally 3 hydrophone spacings from the reference hydrophone in the direction of maximum ship's velocity (fore-aft or athwartships):

$$\tau_d = \frac{(3*H)}{(2*\max(\text{abs}(V_{FA}), \text{abs}(V_{ATW})))} \quad \text{No. 3}$$

wherein
$V_{FA}$ = ships fore-aft velocity
$V_{ATW}$ = ships athwartships velocity
h = adjacent hydrophone separation The SONAR system selects receive pulse pairs for velocity estimation whose separation most closely approximates $\tau_d$. This approach maximizes use of the hydrophone array thereby providing greatest accuracy if the transmit burst duration is at least $\tau_d$ seconds in duration. Accuracy can be considered "degraded" when the desired correlation time ($\tau_d$) cannot be obtained due to insufficient transmit burst duration. The limit for degraded operation occurs when $\tau_d$ equals the burst duration. This leads to a hyperbolic curve (Speed*Depth=constant) because $\tau_d$ is inversely proportional to Speed, where Speed=max abs($V_{FA}$), abs($V_{ATW}$)) from Equation No. 3) and the burst duration is directly proportional to depth, D. Velocity error steadily increases in the "degraded region" ($\tau < \tau_d$) in which the error grows according to $\tau_d/\tau$. FIG. 3 depicts the operating regions for a deep depth ground referenced correlation SONAR system. The error level steadily increases as depth and speed decrease within the degraded region. This model has been shown to provide a good estimation of shallow depth error levels. For deep depths, however, there is no dramatic error growth as Speed approaches zero.

The approaches described in this background section could be pursued, but are not necessarily approaches that have been previously conceived or pursued. Therefore, unless otherwise indicated herein, the approaches described in this background section are not prior art to the claims in this application and are not admitted to be prior art by inclusion in this background section.

SUMMARY

Figure 1:
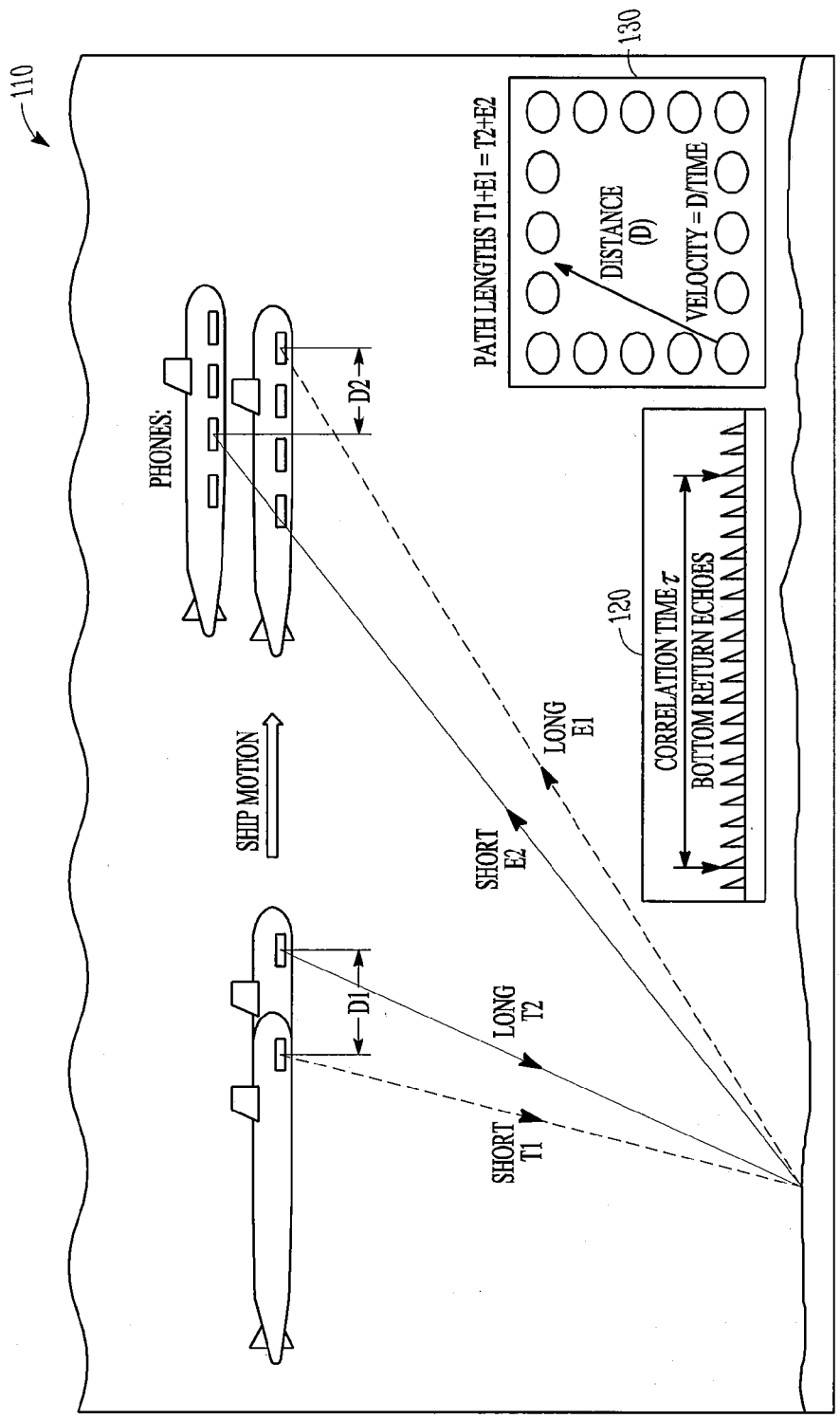
FIG. 1 illustrates an example of a typical SONAR correlation process.

In an embodiment, a correlation SONAR system is adapted for use in shallow water. A pulse generator transmits an initial burst of pulses towards a bottom of a body of water. Echoes of the initial burst of pulses are received on a hydrophone array. After receiving the echoes of the initial burst of pulses, a second burst of pulses is transmitted towards the bottom of the body of water. The echoes of the second burst of pulses are received on the hydrophone array, and a SONAR processor correlates a pulse from the initial burst of pulses and a pulse from the second burst of pulses to calculate a velocity estimate.

DETAILED DESCRIPTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Embodiments of the invention include features, methods or processes embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.)).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include digital/analog signal processing systems, software, data processing hardware, data processing system-implemented methods, and various processing operations, further described herein.

A number of figures show block diagrams of systems and apparatus of embodiments of the invention. A number of figures show flow diagrams illustrating systems and apparatus for such embodiments. The operations of the flow diagrams will be described with references to the systems/apparatuses shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

One or more embodiments of the present disclosure enable use of an existing deep water velocity measuring correlation SONAR system in shallow water (i.e., in water in which the achievable correlation time is less than the desired correlation time) with little or no velocity accuracy degradation, without changes to SONAR system hardware or acoustic sensors (transducers and hydrophones), and with only software changes. These embodiments are comprised entirely of algorithms employed in the SONAR processor to control the electronics and process the data using techniques that provide accuracy comparable to that obtained by the SONAR in deep water.

Specifically, algorithms are employed to control a correlation SONAR system's electronics and to process received data in a manner that enables velocity measuring accuracy in shallow water by use of the full desired correlation time. One or more embodiments eliminate the shallow water roundtrip time constraint on correlation time, which is accomplished via a unique timing of pulse transmission and reception. An initial burst of pulses (two or more) is transmitted and the receive window is opened as required for receipt of the echoes in shallow water, and one of these echoes will be the first echo used for pulse pair velocity estimation. Another pulse is needed for pulse pair velocity estimation so another burst of pulses (one or more) is transmitted during the receive window following receipt of the first echoes. The receive window is kept open to accept the last receive echo(es). One or more embodiments deal with implementation of a time management technique, alternate approaches, a solution of concomitant problems of double bottom bounce avoidance, the impact of own transmission reverberation, and the placement of an ambient noise measurement period in the receive window that is required for the velocity estimation process.

An embodiment provides for full use of a desired correlation time in shallow water in a ground referenced deep water correlation SONAR system via a unique time management scheme as follows. Prior to completion of a SONAR cycle, the most recent estimate of a ship's velocity is used to calculate the desired correlation time, $\tau_d$, as per Equation No. 3. Maximum transmit burst duration for conventional deep depth ground referenced correlation SONAR systems (i.e., the time between first and last pulses) is calculated as K3*(2D/c), where K3 is a fraction typically between 0.75 and 0.85, D is the estimated depth below keel, and c is the speed of sound in water. If $\tau_d$<K3*(2D/c), then desired correlation time can be obtained using a conventional deep depth SONAR system (i.e., transmit burst not constrained by depth). The SONAR system will operate in this case by selecting pulses for correlation processing with separation close to $\tau_d$.

However, if $\tau_d$>K3*(2D/c), then the following is invoked. In an embodiment, at least three pulses should be transmitted. The first two pulses are closely spaced and are needed to execute an "amplitude correlation pulse location" algorithm, which determines the leading edge of the first echo. A wide pulse spacing may cause pulse location failure due to decorrelation resulting from a ship's vertical motions. The third pulse is positioned such that the time between the first and third pulses equals or is approximately equal to $\tau_d$. An embodiment allows the third pulse to be transmitted during the receive window thus alleviating the depth roundtrip constraint on correlation time. One or more embodiments can be employed when (a) the third transmit can occur after the second pulse is received to avoid transmit reverberation contamination, and (b) multiple bottom bounces from either of the first two transmissions do not occur in the vicinity of the third echo. It can be shown that because keel depth (distance from ocean surface to a ship's keel) is greater than zero, the constraint imposed by (b) on use of one or more embodiments is always more severe than that introduced by (a). Therefore, the following inequality should be satisfied in order to employ one or more embodiments of this disclosure:

$$2*(RWS+PLI)+2*ASPACE+\left(2*\frac{KD}{c}\right)<RWS+PLI+\tau_d \qquad \text{No. 4}$$

wherein
RWS (Receive Window Start)=a time from a start of the transmission of the first burst of pulses to the opening of the receive window;
PLI=Pulse Location Search Interval;
ASPACE=a time between the transmission of a first pulse in the first burst of pulses and a transmission of a second pulse in the first burst of pulses;
KD=keel depth; and
c is the speed of sound in water.

Figure 4:
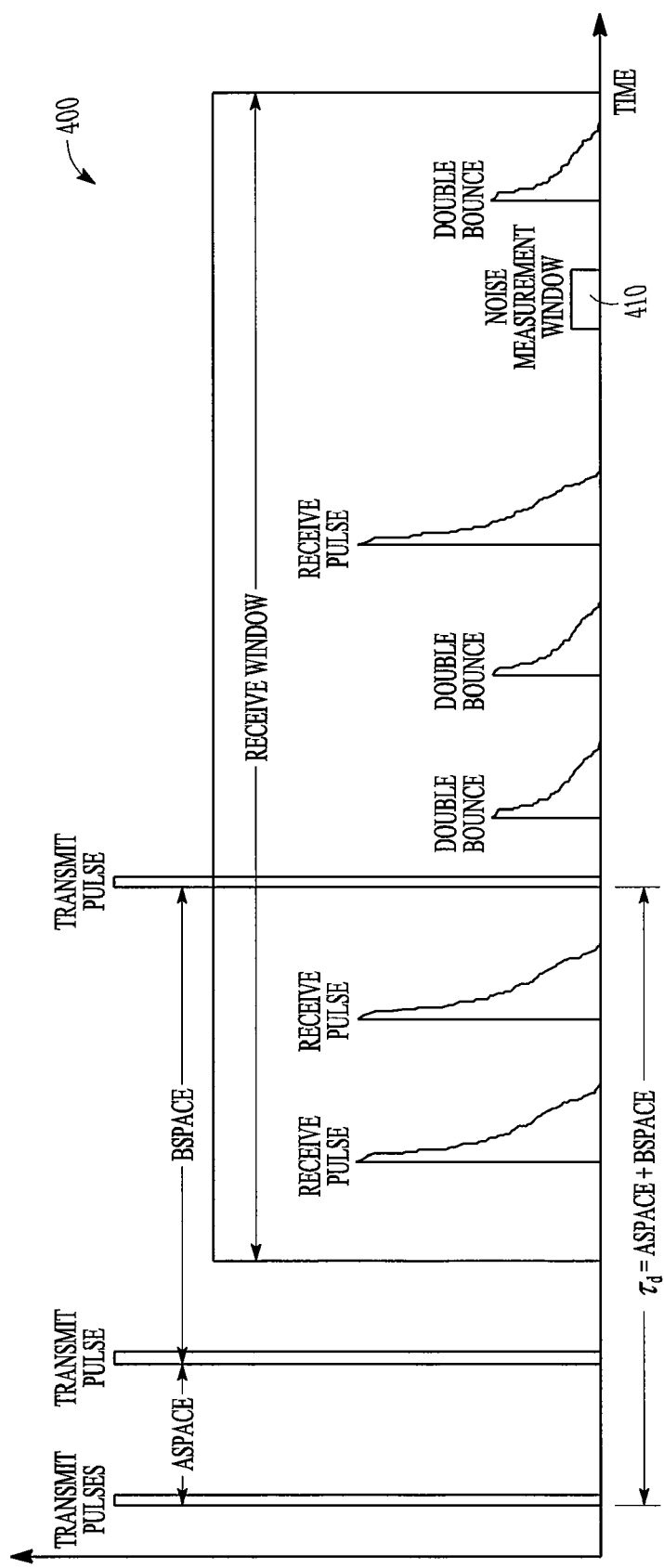
FIG. 4 illustrates an example of a pulse transmit and receive timing scenario.
Figure 5:
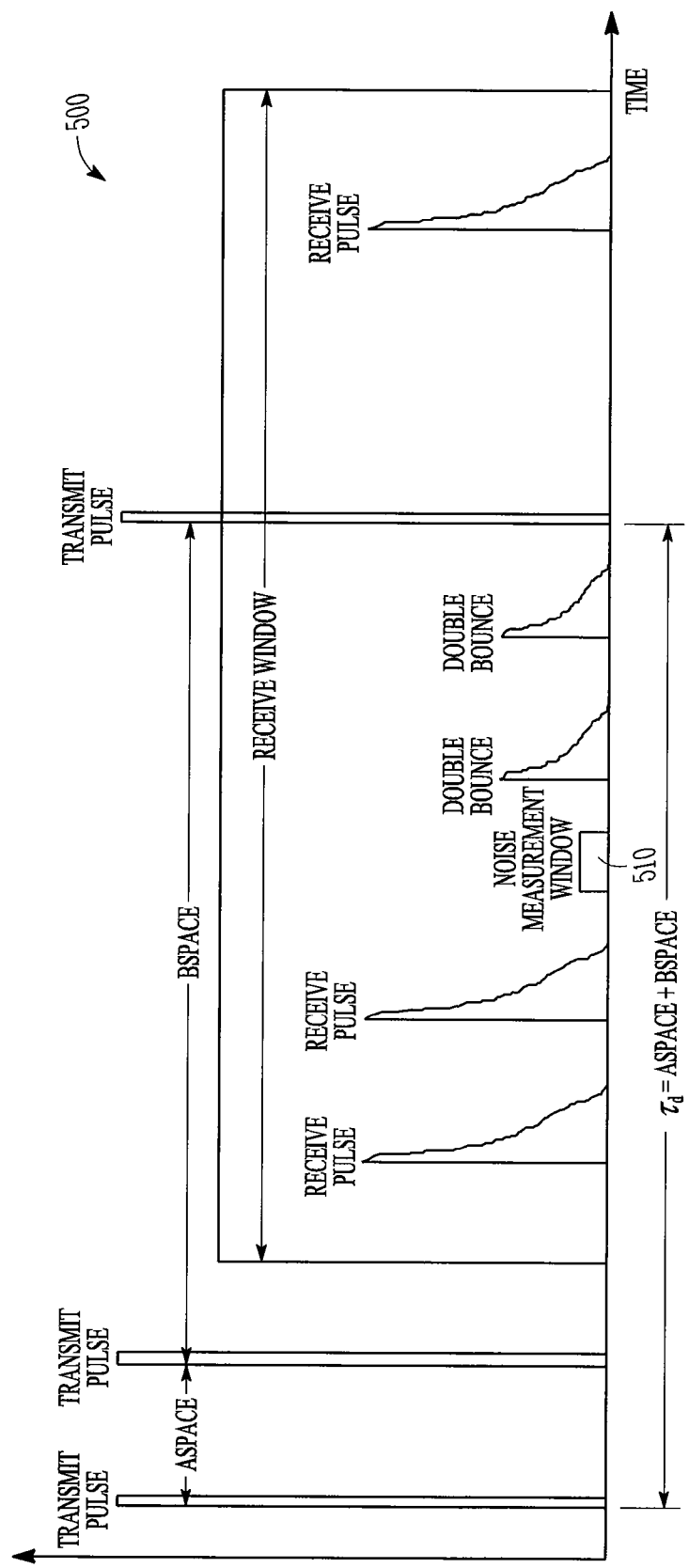
FIG. 5 illustrates another example of a pulse transmit and receive timing scenario.

FIGS. 4 and 5 illustrate two timing scenarios 400 and 500 in which this inequality constraint is met. FIGS. 4 and 5 differ relative to placement of the ambient noise measurement windows 410 and 510, which is further discussed below. The notation BSPACE in FIGS. 4 and 5 is the time between the second and third pulses. RWS+PLI corresponds to the largest RPS (Receive Pulse Start time or round trip time) that can be located. A second ASPACE is included in the inequality equation above to account for pulse stretching. In practice, PLI, ASPACE and KD are quite small relative to $\tau_d$, given the size of a deep depth hydrophone array, so that there is a very minimal constraint on application of these embodiments.

Figure 2:
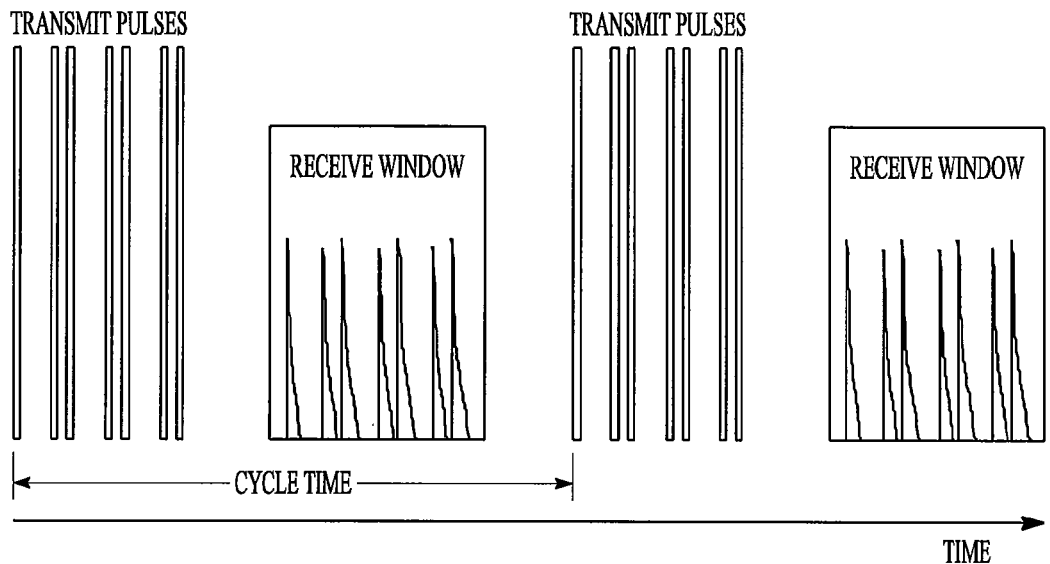
FIG. 2 illustrates typical SONAR cycle windows.

If the inequality in Equation No. 4 is met, then the following is executed (otherwise, conventional correlation SONAR operation is executed for which the transmit/receive timing is as per FIG. 2 and the correlation time may be constrained by the shallow depth).

For each SONAR cycle for which the inequality is satisfied, a set of transmit and receive parameters are calculated by a SONAR processor program and are output to the hardware electronics. Three pulses are transmitted with ASPACE set so as to provide proper operation of a two pulse amplitude correlation pulse location algorithm, and BSPACE is selected such that ASPACE+BSPACE=$\tau_d$. The receive window duration (WDURAT) is computed to provide sufficient time to receive the three bottom returns and a period for ambient noise measurement (which is required for the velocity estimation process). Two cases apply for the WDURAT calculation. If $\tau_d$<2*(RWS+PLI+KD/c), then it is necessary to position the noise measurement just prior to the second bottom bounce of the third transmission. This is illustrated in FIG. 4. For this case:

WDURAT=ASPACE+BSPACE+2*(RWS+PLI+KD/c)−RWS

If however, $\tau_d$>=2*(RWS+PLI+KD/c), then the earliest location for an uncontaminated noise measurement is prior to the second bottom bounce of the first transmission. This is illustrated in FIG. 5. For this case:

WDURAT=2*ASPACE+BSPACE+PLI

A second ASPACE is added for this case to allow for reception of the third echo scatter.

Figure 3:
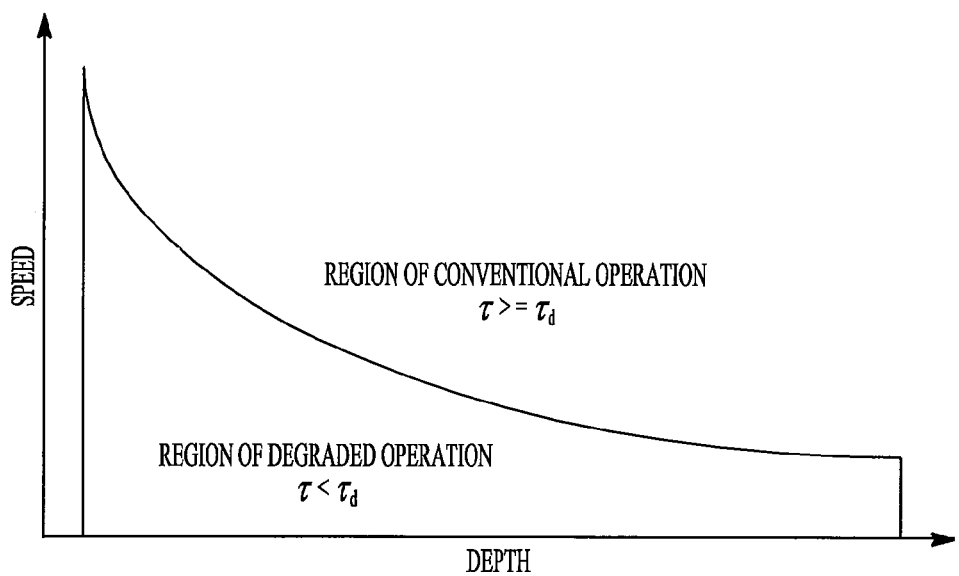
FIG. 3. illustrates operating regions for an embodiment of a deep depth ground referenced correlation SONAR system.
Figure 6:
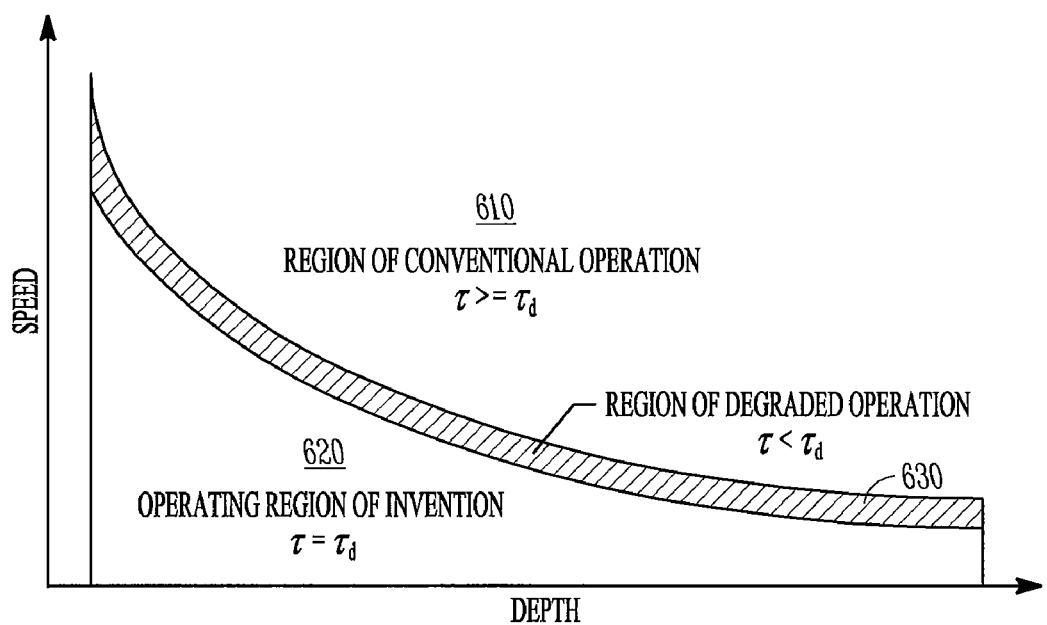
FIG. 6 illustrates operating regions for another embodiment of a deep depth ground referenced correlation SONAR system.

The bottom returns are received and the pulse location algorithm is performed to find the first pulse leading edge which then provides the location of the remaining pulses given ASPACE and BSPACE. The noise measurement interval is positioned as previously described, and correlation velocity estimation processing is then performed, as is known to those of ordinary skill in the art, using data from the first and third echoes. As shown in FIG. 4, if $\tau_d$<2*RPS+2*(KD/c), the noise measurement interval ends no later than the following time into the receive window: 2*RPS+2*(KD/c)+ASPACE+BSPACE−RWS. Otherwise, as shown in FIG. 5, the noise measurement interval ends no later then 2*RPS+2*(KD/c)−RWS into the receive window. This completes velocity processing for a SONAR cycle, and the desired correlation time as calculated from the most recent estimation of the ship's velocity is executed in preparation for the next SONAR cycle. FIG. 6 depicts the depth/speed operating region for this embodiment. The upper right region 610 corresponds to conventional deep depth correlation SONAR operation in which depth and speed are high enough so that t is not constrained by the roundtrip time. The narrow region depicts degraded accuracy operation in which $\tau<\tau_d$ and one or more embodiments should not be used because the constraint discussed above in Equation No. 4 is not met. One or more embodiments apply to the large depth/speed operating region in the lower left 620 of FIG. 6 in which desired correlation time is obtained as per the disclosed embodiments ($\tau=\tau_d$). A comparison of FIG. 6 with FIG. 3 reveals that one or more embodiments eliminate the area of the degraded operating region which is most severely affected by poor accuracy. The narrow band 630 in which one or more embodiments cannot be applied exhibits only slightly degraded performance because of the near unity of $\tau_d/\tau$.

In an alternate embodiment, only two pulses are transmitted in a SONAR cycle vice three pulses with the second pulse transmitted during the receive window and occurring a desired correlation time after the first pulse. An advantage of this approach is that it increases the operational range of the SONAR system to a modest extent. A disadvantage is it does not support as reliable a bi-pulse amplitude correlation as the three pulse approach because that correlation would take place between pulses separated much further in time. Another disadvantage is that an increase in a ship's speed from start of the SONAR cycle to receipt of echoes may yield no velocity solution because of limited hydrophone array size. The three pulse approach addresses this by permitting use of a reduced correlation time in which correlation takes place between pulses 2 and 3 vice 1 and 3.

Another alternate embodiment relates to repackaging of the SONAR cycles. Specifically, instead of transmitting and receiving three pulses in a SONAR cycle and executing pulse pair velocity correlation between the first and third pulses from the same cycle, a first SONAR cycle would provide for transmitting and receiving two pulses and a second SONAR cycle would provide for transmitting and receiving one pulse, and pulse pair velocity estimation would take place between a pulse received in a first SONAR cycle with a pulse received in the following SONAR cycle. This pattern would then continue with alternating 2 and 1 transmit/receive pulse cycles.

A generalization of a SONAR system is to change the pulse spacing ASPACE+BSPACE to be a fraction of the desired correlation time as defined at the time of transmit vice the full time. This approach would permit pulse pair velocity estimation between a pulse in a first SONAR cycle and a pulse in some later SONAR cycle. This would allow for ship speed changes during the transmit and receive periods.

A further alternate embodiment is to simplify pulse cycling execution by eliminating the transmit/receive cycle parameters Window Duration (WDURAT), Receive Window Start Time (RWS) and Cycle Time (TCYCLE). In this approach the receive window would be always open.

A last alternate approach is to increase the number of independent samples of data in bottom return echoes (parameter N in Equation No. 1). As mentioned earlier, N is proportional to fs, the number of independent samples of data per second, which for a matched filter receiver is equal to 1/PW, where PW is the transmit pulse width. The parameter N notionally increases with 1/PW because of the increase in the number of independent rings of illumination on the ocean bottom which contribute to a bottom return echo. An improvement is thus obtainable by decreasing the transmit pulse width which in turn requires a larger receiver band width and data sampling rate and more data echo per unit time.

Figure 7A:
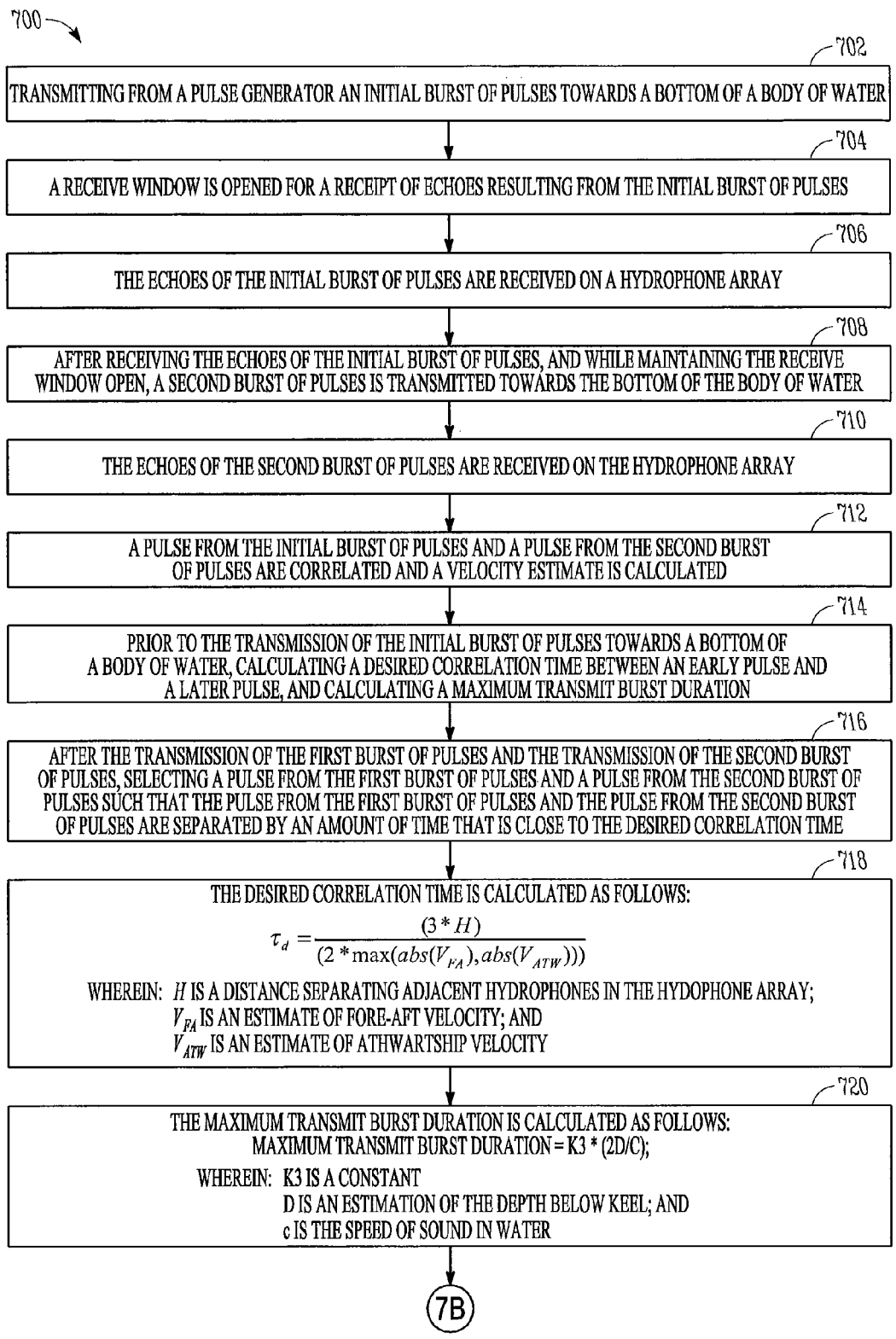
FIGS. 7A, 7B, and 7C are a flowchart of an example embodiment of a process to apply a SONAR system in shallow depth water.
Figure 7B:
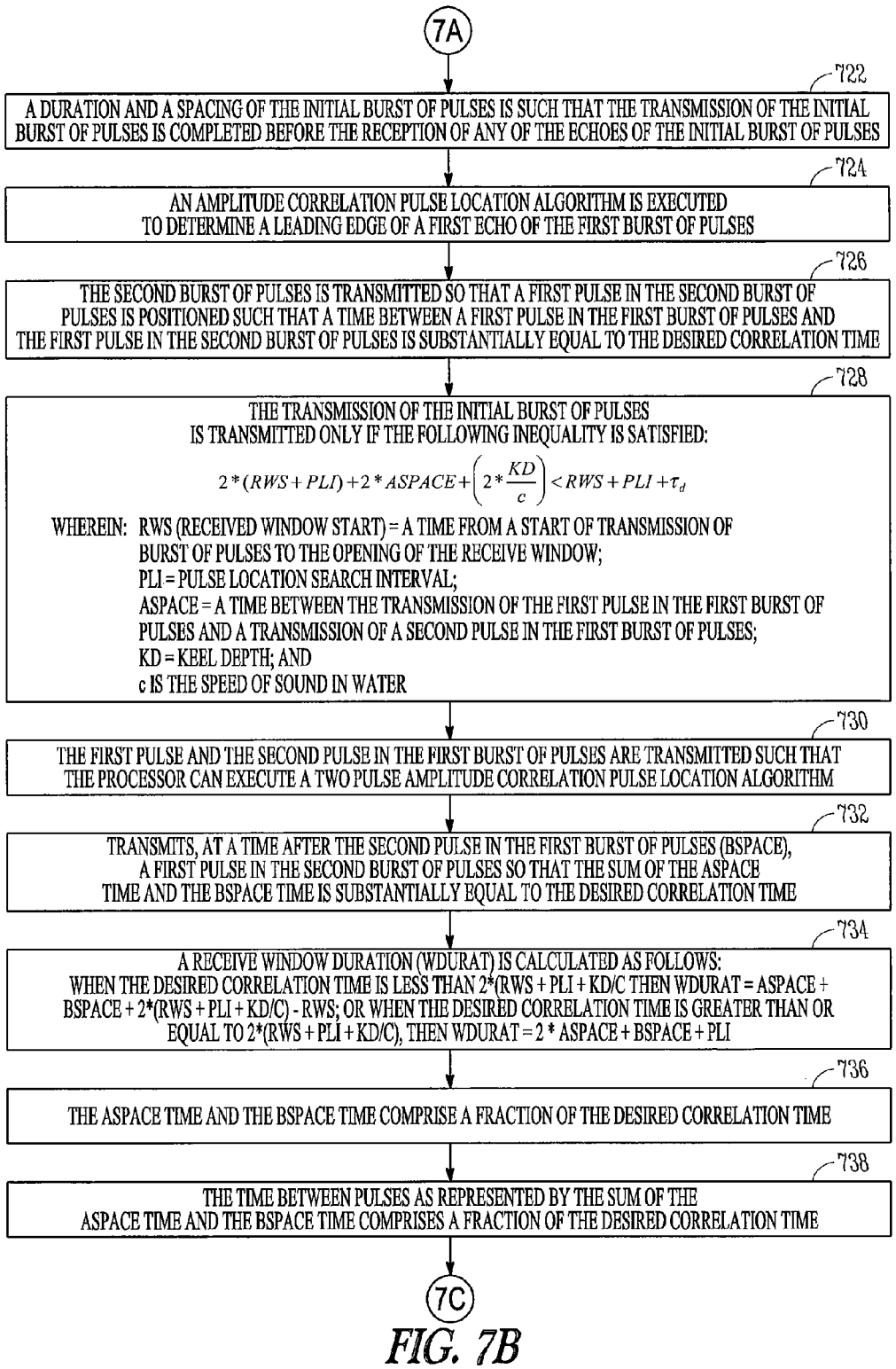
Figure 7C:
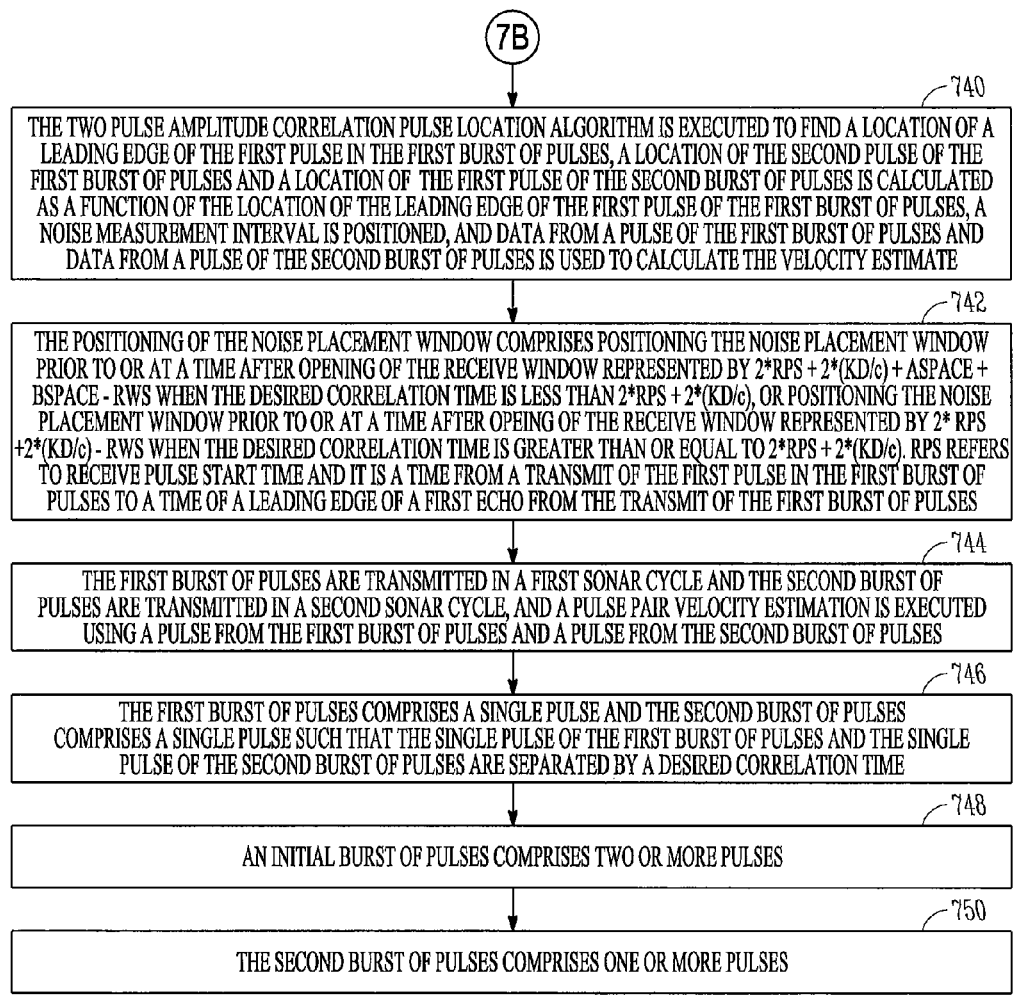

FIG. 7 is a flowchart of an example process 700 for using a deep water correlation SONAR system in shallow water. FIG. 7 includes a number of process blocks 705-750. Though arranged serially in the example of FIG. 7, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring to FIG. 7, the process 700 includes at 702 transmitting from a pulse generator an initial burst of pulses towards a bottom of a body of water. At 704, a receive window is opened for a receipt of echoes resulting from the initial burst of pulses. At 706, the echoes of the initial burst of pulses are received on a hydrophone array. At 708, after receiving the echoes of the initial burst of pulses, and while maintaining the receive window open, a second burst of pulses is transmitted towards the bottom of the body of water. At 710, the echoes of the second burst of pulses are received on the hydrophone array. At 712, a pulse from the initial burst of pulses and a pulse from the second burst of pulses are correlated and a velocity estimate is calculated.

At 714, the process 700, prior to the transmission of the initial burst of pulses towards a bottom of a body of water, calculates a desired correlation time between an early pulse and a later pulse, and calculates a maximum transmit burst duration. At 716, the process 700, after the transmission of the first burst of pulses and the transmission of the second burst of pulses, selects a pulse from the first burst of pulses and a pulse from the second burst of pulses such that the pulse from the first burst of pulses and the pulse from the second burst of pulses are separated by an amount of time that is close to the desired correlation time.

At 718, the desired correlation time is calculated as follows:

$$\tau_d = \frac{(3*H)}{(2*\max(\mathrm{abs}(V_{FA}), \mathrm{abs}(V_{ATW})))}$$

wherein

H is a distance separating adjacent hydrophones in the hydrophone array;

$V_{FA}$ is an estimate of fore-aft velocity; and $V_{ATW}$ is an estimate of athwartship velocity.

At 720, the maximum transmit burst duration is calculated as follows:

maximum transmit burst duration=$K3*(2D/c)$;

wherein

K3 is a constant;

D is an estimation of the depth below keel; and c is the speed of sound in water.

At 722, a duration and a spacing of the initial burst of pulses is such that the transmission of the initial burst of pulses is completed before the reception of any of the echoes of the initial burst of pulses. At 724, an amplitude correlation pulse location algorithm is executed to determine a leading edge of a first echo of the first burst of pulses. At 726, the second burst of pulses is transmitted so that a first pulse in the second burst of pulses is positioned such that a time between a first pulse in the first burst of pulses and the first pulse in the second burst of pulses is substantially equal to the desired correlation time.

At 728, the transmission of the initial burst of pulses is transmitted only if the following inequality is satisfied:

$$2*(RWS+PLI)+2*ASPACE+\left(2*\frac{KD}{c}\right)<RWS+PLI+\tau_d$$

wherein

RWS (Receive Window Start)=a time from a start of the transmission of the first burst of pulses to the opening of the receive window;

PLI=Pulse Location Search Interval;

ASPACE=a time between the transmission of the first pulse in the first burst of pulses and a transmission of a second pulse in the first burst of pulses;

KD=keel depth; and c is the speed of sound in water.

At 730, the first pulse and the second pulse in the first burst of pulses are transmitted such that the processor can execute a two pulse amplitude correlation pulse location algorithm. At 732, the process 700 transmits, at a time after the second pulse in the first burst of pulses (BSPACE), a first pulse in the second burst of pulses so that the sum of the ASPACE time and the BSPACE time is substantially equal to the desired correlation time. At 734, a receive window duration (WDURAT) is calculated as follows:

when the desired correlation time is less than 2*(RWS+PLI+KD/c), then

WDURAT=ASPACE+BSPACE+2*(RWS+PLI+KD/c)−RWS; or when the desired correlation time is greater than or equal to 2*(RWS+PLI+KD/c), then

WDURAT=2*ASPACE+BSPACE+PLI.

At 736, the ASPACE time and the BSPACE time comprise a fraction of the desired correlation time. At 738, the time between pulses as represented by the sum of the ASPACE time and the BSPACE time comprises a fraction of the desired correlation time. At 740, the two pulse amplitude correlation pulse location algorithm is executed to find a location of a leading edge of the first pulse in the first burst of pulses, a location of the second pulse of the first burst of pulses and a location of the first pulse of the second burst of pulses is calculated as a function of the location of the leading edge of the first pulse of the first burst of pulses, a noise measurement interval is positioned, and data from a pulse of the first burst of pulses and data from a pulse of the second burst of pulses is used to calculate the velocity estimate.

At 742, the positioning of the noise placement window comprises positioning the noise placement window prior to or at a time after opening of the receive window represented by 2*RPS+2*(KD/c)+ASPACE+BSPACE−RWS when the desired correlation time is less than 2*RPS+2*(KD/c), or positioning the noise placement window prior to or at a time after opening of the receive window represented by 2*RPS+2*(KD/c)−RWS when the desired correlation time is greater than or equal to 2*RPS+2*(KD/c). RPS refers to Receive Pulse Start time and it is a time from a transmit of the first pulse in the first burst of pulses to a time of a leading edge of a first echo from the transmit of the first burst of pulses.

At 744, the first burst of pulses comprises a single pulse and the second burst of pulses comprises a single pulse such that the single pulse of the first burst of pulses and the single pulse of the second burst of pulses are separated by a desired correlation time. At 746, the first burst of pulses are transmitted in a first SONAR cycle and the second burst of pulses are transmitted in a second SONAR cycle, and a pulse pair velocity estimation is executed using a pulse from the first burst of pulses and a pulse from the second burst of pulses.

At 748, an initial burst of pulses comprises two or more pulses, and at 750, the second burst of pulses comprises one or more pulses.

Figure 8:
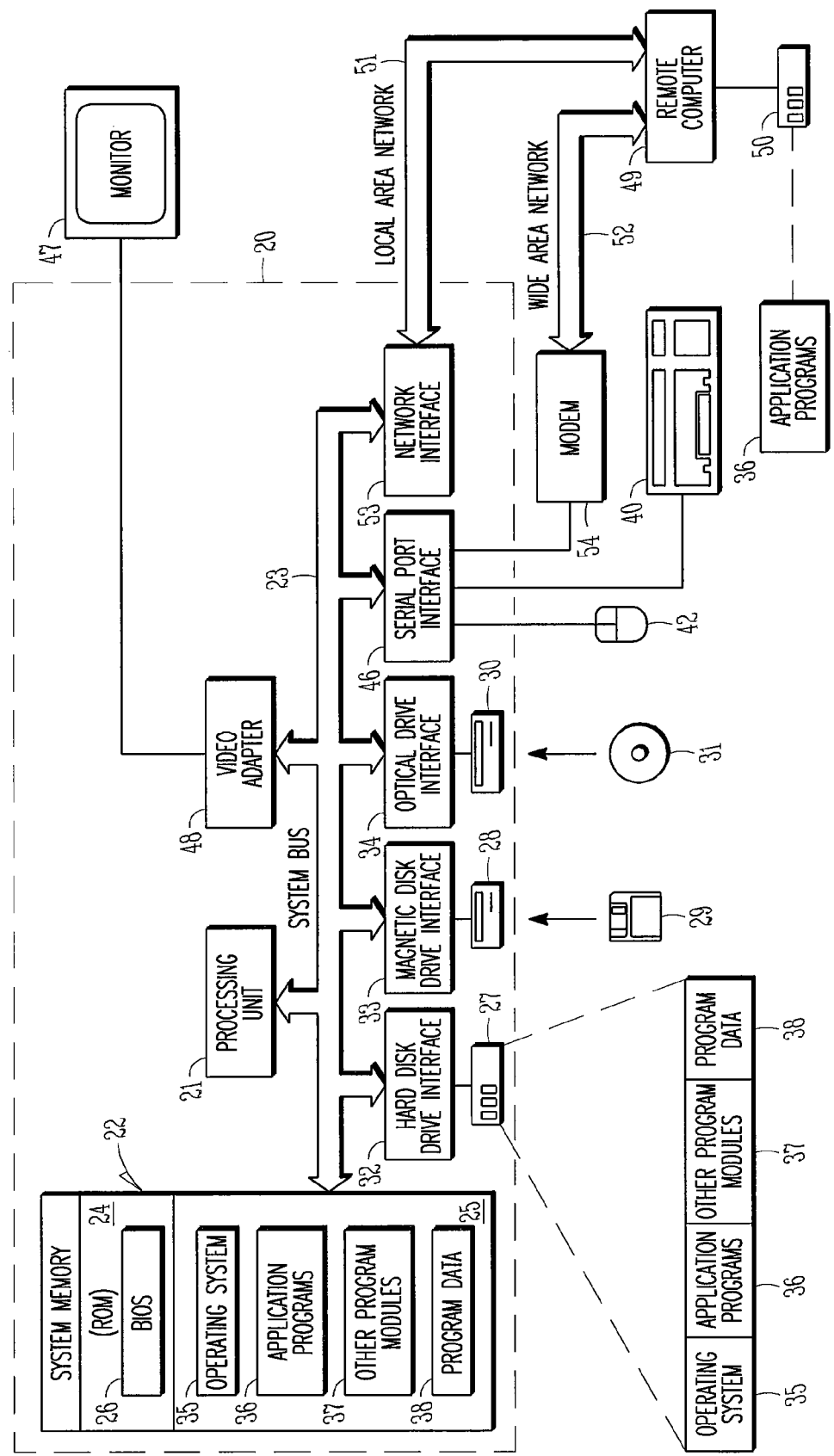
FIG. 8 is a block diagram of an example computer processor embodiment that can be used in connection with the present disclosure.

FIG. 8 is an overview diagram of a hardware and operating environment in conjunction with which embodiments of the invention may be practiced. The description of FIG. 8 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

In the embodiment shown in FIG. 8, a hardware and operating environment is provided that is applicable to any of the servers and/or remote clients shown in the other Figures.

As shown in FIG. 8, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 8 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Thus, an example system, method and machine readable medium for using a deep water correlation SONAR system in shallow depth water has been described. Although specific example embodiments have been described, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A computerized process to use a correlation SONAR system in shallow water comprising:
transmitting from a pulse generator an initial burst of pulses towards a bottom of a body of water;
receiving echoes of the initial burst of pulses on a hydrophone array;
after the receiving the echoes of the initial burst of pulses, transmitting a second burst of pulses towards the bottom of the body of water;
receiving echoes of the second burst of pulses on the hydrophone array;
using a processor to correlate a pulse from the initial burst of pulses and a pulse from the second burst of pulses to calculate a velocity estimate;
prior to the transmission of the initial burst of pulses towards a bottom of a body of water:
calculating a desired correlation time between an early pulse and a later pulse; and
calculating a maximum transmit burst duration; and
after determining that the desired correlation time is greater than the maximum transit burst duration, thereby indicating that the second burst of pulses is needed, and after the transmission of the initial burst of pulses and the transmission of the second burst of pulses:
selecting a pulse from the initial burst of pulses and a pulse from the second burst of pulses such that the pulse from the initial burst of pulses and the pulse from the second burst of pulses are separated by an amount of time that is close to the desired correlation time;
wherein shallow water comprises a depth of water wherein an achievable correlation time is less than the desired correlation time when two pulses are from either the initial burst or the second burst;
wherein the desired correlation time is calculated as follows:

$$\tau_d = \frac{(3*H)}{(2*\max(\text{abs}(V_{FA}), \text{abs}(V_{ATW})))}$$

wherein
H is a distance separating adjacent hydrophones in the hydrophone array;
$V_{FA}$ is an estimate of fore-aft velocity; and
$V_{ATW}$ is an estimate of athwartship velocity; and
wherein the achievable correlation time is close to the maximum transit burst duration.

2. The computerized process of claim 1, wherein the maximum transmit burst duration is calculated as follows:
maximum transmit burst duration=K3*(2D/c);
wherein
K3 is a constant;
D is an estimation of the depth below keel; and
c is the speed of sound in water.

3. The computerized process of claim 2, wherein the transmitting an initial burst of pulses, opening a receive window, receiving the echoes of the initial burst of pulses, the transmitting the second burst of pulses, the receiving the echoes of the second burst of pulses, and the correlating a pulse from the initial burst of pulses and a pulse from the second burst of pulses to calculate a velocity estimate is executed only when the desired correlation time is greater than or equal to the maximum transmit burst duration.

4. The computerized process of claim 1, wherein a duration and a spacing of the initial burst of pulses is such that the transmission of the initial burst of pulses is completed before the reception of any of the echoes of the initial burst of pulses.

5. The computerized process of claim 4, comprising executing an amplitude correlation pulse location algorithm to determine a leading edge of a first echo of the first burst of pulses.

6. The computerized process of claim 5, comprising transmitting the second burst of pulses so that a first pulse in the second burst of pulses is positioned such that a time between a first pulse in the first burst of pulses and the first pulse in the second burst of pulses is substantially equal to the desired correlation time.

7. The computerized process of claim 1, wherein the initial burst of pulses is transmitted only if the following inequality is satisfied:

$$2*(RWS+PLI)+2*ASPACE+\left(2*\frac{KD}{c}\right) < RWS+PLI+\tau_d$$

wherein
RWS (Receive Window Start)=a time from a start of the transmission of the first burst of pulses to the opening of the receive window;
PLI=Pulse Location Search Interval;
ASPACE=a time between the transmission of the first pulse in the first burst of pulses and a transmission of a second pulse in the first burst of pulses;
KD=keel depth; and
c is the speed of sound in water.

8. The computerized process of claim 7, comprising:
transmitting the first pulse and the second pulse in the first burst of pulses such that the processor can execute a two pulse amplitude correlation pulse location algorithm;
transmitting, at a time after the second pulse in the first burst of pulses (BSPACE), a first pulse in the second burst of pulses so that the sum of the ASPACE time and the BSPACE time is substantially equal to the desired correlation time; and
using the processor to calculate a receive window duration (WDURAT), the receive window duration calculated as follows:
when the desired correlation time is less than 2*(RWS+PLI+KD/c), then WDURAT=ASPACE +BSPACE+2*(RWS+PLI+KD/c)-RWS; or when the desired correlation time is greater than or equal to 2 *(RWS+PLI+KD/c), then

WDURAT=2*ASPACE+BSPACE+PLI.

9. The computerized process of claim 8, wherein the ASPACE time and the BSPACE time comprise a fraction of the desired correlation time.

10. The computerized process of claim 8, wherein the time between pulses as represented by the sum of the ASPACE time and the BSPACE time comprises a fraction of the desired correlation time.

11. The computerized process of claim 8, comprising:
executing the two pulse amplitude correlation pulse location algorithm to find a location of leading edge of the first pulse in the first burst of pulses;
calculating a location of the second pulse of the first burst of pulses and a location of the first pulse of the second burst of pulses as a function of the location of the leading edge of the first pulse of the first burst of pulses;
positioning a noise measurement interval; and
using data from a pulse of the first burst of pulses and data from a pulse of the second burst of pulses to calculate the velocity estimate.

12. The computerized process of claim 11, wherein the positioning of the noise placement window comprises:
positioning the noise placement window prior to or at a time after opening of the receive window represented by 2*RPS+2*(KD/c)+ASPACE+BSPACE−RWS when the desired correlation time is less than 2*RPS+2*(KD/c); or
positioning the noise placement window prior to or at a time after opening of the receive window represented by 2*RPS+2*(KD/c)−RWS when the desired correlation time is greater than or equal to 2*RPS+2*(KD/c);
wherein RPS is a time from a transmit of the first pulse in the first burst of pulses to a time of a leading edge of a first echo from the transmit of the first burst of pulses.

13. The computerized process of claim 1, wherein the first burst of pulses comprises a single pulse and the second burst of pulses comprises a single pulse such that the single pulse of the first burst of pulses and the single pulse of the second burst of pulses are separated by a desired correlation time.

14. The computerized process of claim 1, comprising:
transmitting the first burst of pulses in a first SONAR cycle and transmitting the second burst of pulses in a second SONAR cycle; and
executing a pulse pair velocity estimation using a pulse from the first burst of pulses and a pulse from the second burst of pulses.

15. The computerized process of claim 1, wherein the initial burst of pulses comprises two or more pulses.

16. The computerized process of claim 1, the second burst of pulses comprises one or more pulses.

17. The computerized process of claim 1, comprising:
decreasing a transmit pulse width of one or more of the initial burst of pulses and the second burst of pulses;
increasing a receiver band width to receive echoes of the initial burst of pulses and the second burst of pulses; and
increasing a data sampling rate for the echoes of the initial burst of pulses and the second burst of pulses.

18. The computerized process of claim 1, comprising:
opening a receive window for the receipt of echoes resulting from the initial burst of pulses; and
maintaining the receive window open while transmitting the second burst of pulses.

19. A tangible computer readable medium comprising instructions that when executed by a computer processor executes a process to use a correlation SONAR system in shallow water comprising:
transmitting from a. pulse generator an initial burst of pulses towards a bottom of a body of water;
receiving echoes of the initial burst of pulses on a hydrophone array;
after the receiving the echoes of the initial burst of pulses, transmitting a second burst of pulses towards the bottom of the body of water;
receiving echoes of the second burst of pulses on the hydrophone array;
using a processor to correlate a pulse from the initial burst of pulses and a pulse from the second burst of pulses to calculate a velocity estimate;
prior to the transmission of the initial burst of pulses towards a bottom of a body of water:
calculating a desired correlation time between an early pulse and a later pulse; and
calculating a maximum transmit burst duration; and
after determining that the desired correlation time is greater than the maximum transit burst duration, thereby indicating that the second burst of pulses is needed, and after the transmission of the initial burst of pulses and the transmission of the second burst of pulses:
selecting a pulse from the initial burst of pulses and a pulse from the second burst of pulses such that the pulse from the initial burst of pulses and the pulse from the second burst of pulses are separated by an amount of time that is close to the desired correlation time;
wherein shallow water comprises a depth of water wherein an achievable correlation time is less than the desired correlation time when two pulses are from either the initial burst or the second burst;
wherein the desired correlation time is calculated as follows:

$$\tau_d = \frac{(3*H)}{(2*\max(\text{abs}(V_{FA}), \text{abs}(V_{ATW})))}$$

wherein
H is a distance separating adjacent hydrophones in the hydrophone array;
$V_{FA}$ is an estimate of fore-aft velocity; and
$V_{ATW}$ is an estimate of athwartship velocity; and
wherein the achievable correlation time is close to the maximum transit burst duration.

20. A correlation SONAR system configured for use in shallow water, the SONAR system comprising a processor configured to:
transmit from a pulse generator an initial burst of pulses towards a bottom of a body of water;
receive echoes of the initial burst of pulses on a hydrophone array;
after the receipt of the echoes of the initial burst of pulses, transmit a second burst of pulses towards the bottom of the body of water;
receive echoes of the second burst of pulses on the hydrophone array;
correlate a pulse from the initial burst of pulses and a pulse from the second burst of pulses to calculate a velocity estimate;
prior to the transmission of the initial burst of pulses towards a bottom of a body of water:
calculating a desired correlation time between an early pulse and a later pulse; and
calculating a maximum transmit burst duration; and
after determining that the desired correlation time is greater than the maximum transit burst duration, thereby indicating that the second burst of pulses is needed, and after the transmission of the initial burst of pulses and the transmission of the second burst of pulses:
selecting a pulse from the initial burst of pulses and a pulse from the second burst of pulses such that the pulse from the initial burst of pulses and the pulse from the second burst of pulses are separated by an amount of time that is close to the desired correlation time;
wherein shallow water comprises a depth of water wherein an achievable correlation time is less than the desired correlation time when two pulses are from either the initial burst or the second burst;

wherein the desired correlation time is calculated as follows:

$$\tau_d = \frac{(3*H)}{(2*\max(\text{abs}(V_{FA}), \text{abs}(V_{ATW})))}$$

wherein
  H is a distance separating adjacent hydrophones in the hydrophone array;
  $V_{FA}$ is an estimate of fore-aft velocity; and
  $V_{ATW}$ is an estimate of athwartship velocity; and
  wherein the achievable correlation time is close to the maximum transit burst duration.

\* \* \* \* \*